United States Patent
Drew

[15] 3,646,847
[45] Mar. 7, 1972

[54] SLUG-THROWING DEPLOYMENT APPARATUS

[72] Inventor: Gene R. Drew, El Centro, Calif.

[73] Assignee: The United States of America as represented by the Secretary of the Navy

[22] Filed: Jan. 26, 1970

[21] Appl. No.: 5,827

[52] U.S. Cl. ...................................89/1 G, 102/89, 244/141
[51] Int. Cl. ..........................................................F41f 1/00
[58] Field of Search ..............244/141, 122, 148; 89/1, 1.34; 42/1; 102/89

[56] References Cited

UNITED STATES PATENTS

| | | |
|---|---|---|
| 2,502,470 | 4/1950 | Martin...............................244/141 X |
| 3,314,286 | 4/1967 | Hickerson et al.....................102/89 X |
| 2,111,374 | 3/1938 | Sedgley................................102/89 X |
| 2,471,353 | 5/1949 | Schermuly et al. ........................102/89 |
| 2,999,659 | 9/1961 | Martin....................................244/141 |

*Primary Examiner*—Samuel W. Engle
*Attorney*—R. S. Sciascia, George J. Rubens and J. W. McLaren

[57] ABSTRACT

A general purpose deployment gun utilizing a projectable slug for propelling a load. The load is attached to the slug by a movable connection which enables the slug to be propelled by a symmetrical application of forces without the need for reversing its course thereby providing a smooth, stabilized flight.

4 Claims, 6 Drawing Figures

PATENTED MAR 7 1972

INVENTOR.
GENE R. DREW
BY
George J. Rubens
ATTORNEYS

SLUG-THROWING DEPLOYMENT APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to slug-throwing deployment apparatus and especially such apparatus that will provide a stable flight by the application of uniform forces to the object being propelled.

Slug-throwing devices are used by the armed forces for many purposes, i.e., aircraft escape systems, ship-to-ship transfer of fuel lines, mail and passengers while the ships are underway. A typical application of slug-throwing devices for aircraft escape systems of the Martin-Baker type may be illustrated by U.S. Pat. No. 2,999,659. In that device the slug is attached by a flexible drawline to one or more drogue parachutes connected in tandem. The slug is propelled by a gun mounted in an ejection seat for deploying the parachutes in an expeditious manner which is particularly important in low level ejections. The drawline is connected to the muzzle end of the slug by a hinge connection or the like. Upon ejection of the slug, the drag on the leading end of the slug by the drawline causes the slug to rotate and reverse its orientation in flight creating an unstable flight pattern and causing the drawline to whip.

SUMMARY OF THE INVENTION

The invention apparatus provides a general purpose deployment slug that is particularly suitable for deploying the drogue parachutes of an ejection seat escape system as well as being employable in the other applications mentioned. The apparatus comprises essentially a cylinder securely affixed in the ejection seat. Slidably disposed in the cylinder is an ejectable slug capable of being propelled by a conventional explosive cartridge or the like mounted in the base of the cylinder. An attachment block is slidably mounted on the slug and confined in movement between the ends, the block having means for attaching the drawline which in turn is connected to the load, i.e., parachute. Means are provided releasably to secure the slug within the cylinder in an inoperative condition to prevent inadvertent separation. Upon deployment, the releasible means are activated and the slug is propelled from the cylinder. The attachment block slides over the slug from a position adjacent to the muzzle end to an aft position in a manner that avoids the need for turning and reorienting of the slug in flight caused by the tension of the drawline and load. The symmetrical and uniform application of the drag forces on the drawline improves the man-seat stabilization by eliminating unstable flight and the whipping of the drawline and the adverse affects resulting therefrom.

STATEMENTS OF THE OBJECTS OF THE INVENTION

A principle object of the invention is to provide a more efficient propulsive energy source for deployment of a load to be propelled thereby.

A further object of the invention is to provide more efficient utilization of the slug kinetic energy to improve ejection seat reliability, and a corollary object is to accomplish these results with no significant increase in weight, cost, or complexity of the ejection seat.

Another important object is to provide a slug throwing apparatus which improves extraction of the drogue-stabilizer chutes by providing a symmetrical application of forces that stabilizes slug flight and eliminates drawline whipping.

Other objects, advantages and novel features of the invention will become apparent from the following detailed description of the invention when considered in conjunction with the accompanying drawings wherein:

DESCRIPTION OF THE PREFERRED EMBODIMENTS

Figure 2:
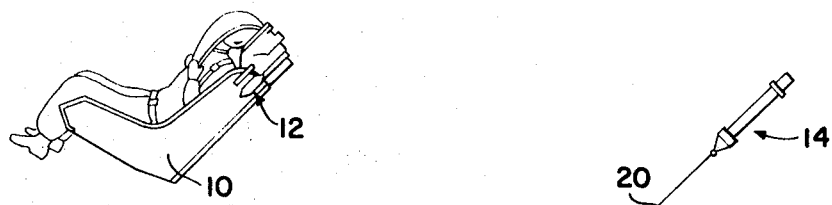
FIGS. 2 and 3 are immediately subsequent phases of the ejection showing deployment of a drogue chute by the invention slug-throwing apparatus.
Figure 1:
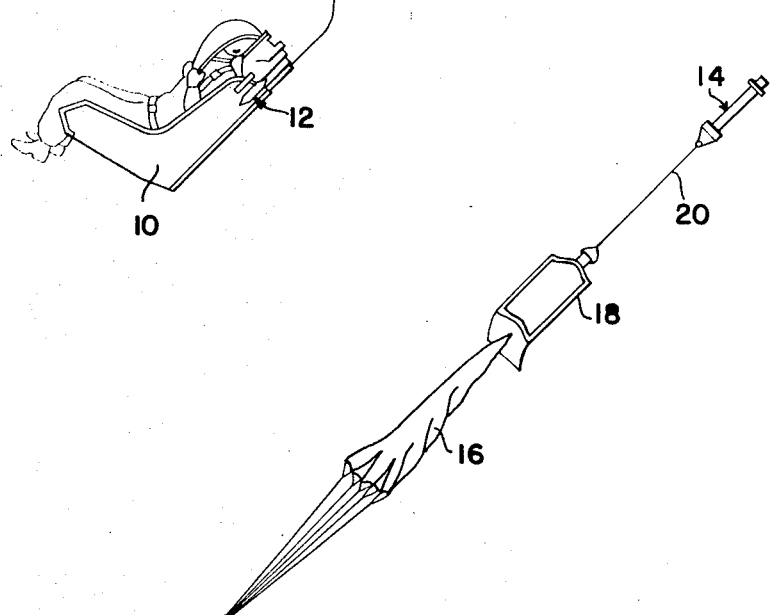
FIG. 1 is a schematic representation of a military aircraft ejection seat incorporating the novel invention, the seat having been ejected from an aircraft in the initial phase of deployment.
Figure 3:
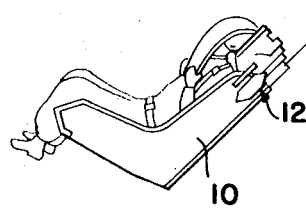

Referring to the drawings where like reference numerals refer to similar parts throughout the drawing, there is shown in FIG. 1 a military ejection seat 10 having been ejected from an aircraft, not shown. Mounted on the side of seat is a drogue gun 12 from which is propelled a slug or projectile 14 for deploying a stabilization system including drogue chute 16 by means of a deployment bag 18, as shown in FIGS. 2 and 3.

Figure 4:
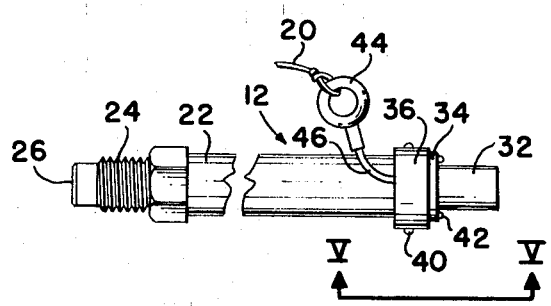
FIG. 4 is a side elevation view of the drogue gun and slug in an inactive condition.
Figure 6:
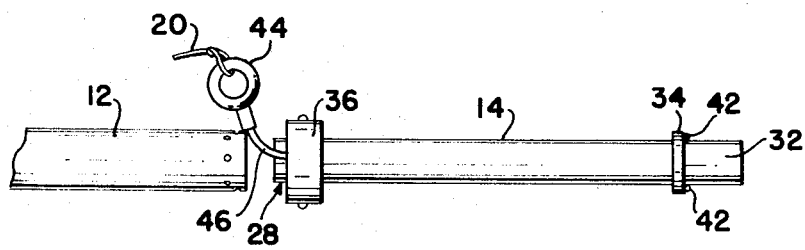
FIG. 6 is a side elevation view of the drogue gun and slug immediately after separation from the gun tube in a deployed condition.
Figure 5:
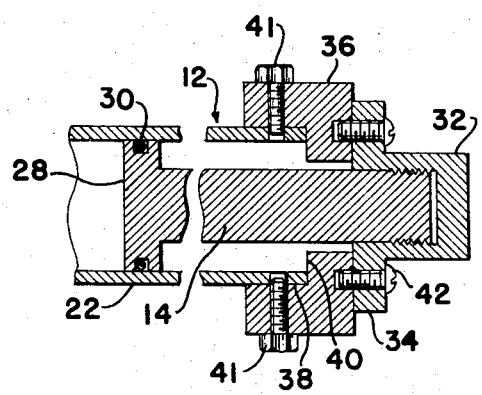
FIG. 5 is an enlarged cross section taken along line V - V of FIG. 4.

The present invention pertains to the novel details of drogue gun 12 and associated slug 14 as shown in FIGS. 4–6 inclusive so as to provide a more efficient utilization of drogue gun propulsive energy. As shown in FIG. 4 drogue gun 12 comprises a gun barrel 22 having a threaded end 24 for mounting into the firing mechanism on the seat (not shown). Threaded end 24 is adapted to receive a cartridge 26 for providing the explosive force for propelling slug 14 from within barrel 22. Slug 14, as shown in FIG. 5, is slidably mounted in barrel 22 and has at its base end an enlarged piston portion 28 provided with an O-ring 30 or the like for sealably engaging the bore of the barrel. The explosive force created by the discharge of cartridge 26 is applied against the face of piston portion 28 to propel the slug out of the barrel. The muzzle end of slug 14 is threaded or otherwise secured to an enlarged cap 32 having a peripheral flange 34. An attachment block 36 in the form of a sleeve is slidably mounted on the intermediate reduced diameter of slug 14 between ends 28 and 32. The slug can be said to include piston portion 28 and cap 32. Attachment block 36 is provided with a stepped bore 38 to fit slidably over the muzzle end of barrel 22 being abutted by bore shoulder 40. Block 36 is secured detachably to the barrel end by plurality of transversely positioned shear bolts 41 designed to be severed by the impact of piston 28 on shoulder 40 of block 36 when propelled by the explosive force of cartridge 26.

Slug 14 is held in a nested position within gun barrel 22 by a plurality of screws 42 longitudinally extending between flange 34 and the block 36, screws 42 being designed to fail in tension under the explosive force on piston 28.

As shown in FIG. 6, a ring 44 is anchored by a line 46 to attachment block 36. Ring 44 can be connected to drawline 20 or any other load that slug 14 is employed to propel, such as a throwline etc.

The operation of the slug throwing apparatus is apparent from the drawings. Upon ignition of cartridge 26, the explosive force exerted on piston 28 causes screws 42 to fail in tension freeing slug 14 from block 36 to commence the ejection movement out of gun barrel 22 which remains fixed to seat 10. When slug piston 28 advances to the muzzle end of barrel 22, the piston engages shoulder 40 of the attachment block causing bolts 41 to shear. This action frees block 36 from barrel 22 for travel along with slug 14 and pulls the ring 44 and the attached load to deploy the drogue chute.

The sliding movement of slug 14 within attachment block 36 transfers the position of the latter from the muzzle end to the aft end of slug 14 to ensure a symmetrical application of forces. The drogue chute is extracted with an even and continuous tension on the drawline to the load which stabilizes slug flight. This arrangement eliminates the need for the slug to rotate during flight and the accompanying instability in flight that heretofor reduced the efficiency of the slug throwing apparatus.

Obviously many modifications and variations of the present invention are possible in the light of the above teachings. It is therefore to be understood that within the scope of the appended claims the invention may be practiced otherwise than as specifically described.

What is claimed is:

1. In a line-projecting apparatus for propelling a slug comprising:
   a barrel having means at one end for creating a propelling force,
   an elongate slug telescopically and slidably mounted through the other end of the barrel;
   attachment means for connecting the slug to a load; and
   means for confining said attachment means between the ends of said slug from a position forward on the slug to a position aft on the slug when it is propelled from the barrel,
   said confining means including a sleeve member slidably mounted on the slug, said slug being provided with an enlarged shoulder at the forward and aft ends between which said sleeve member is confined in movement;
   whereby the load is pulled by the slug with a symmetrical application of force and in a stable flight without reversing the direction of orientation of said slug during flight.

2. The apparatus of claim 1 wherein is provided a fastener for securing one of said shoulders to the sleeve member, said fastener capable of failing in tension by the propelling force.

3. The apparatus of claim 2 wherein a shear bolt connects said sleeve member to the barrel, said shear bolt being severable by engagement of the other shoulder of said slug with said sleeve member.

4. In an apparatus for propelling a load comprising:
   a barrel;
   means for supporting the barrel;
   an explosive cartridge mounted at one end of said barrel being open;
   an elongate projectile telescopically mounted in the barrel through said open end and slidable therein;
   said projectile having enlarged end portions at a muzzle end and a breech end of said barrel and a reduced diameter intermediate portion;
   an attachment sleeve slidably mounted on the projectile being restrained in movement between said enlarged end portions;
   means for connecting said attachment sleeve to a load to be propelled;
   a plurality of shear bolts for releasably securing said sleeve at the open end of said barrel;
   a plurality of members releasably securing the enlarged muzzle portion of said projectile to said sleeve, said members capable of failing in tension upon the application of a predetermined force;
   whereby ignition of said cartridge will force the projectile to break said members to free the projectile from the sleeve for movement relative thereto until the enlarged breech end of said projectile advances to engage the sleeve and breaking the shear bolts to free the sleeve and projectile from the barrel.

* * * * *